E. L. BUSHNELL.

Improvement in Spring Mattresses.

No. 4,616. Reissued Oct. 31, 1871.

Witnesses.

Harry King.

Phil. T. Dodge.

Inventor.

E. L. Bushnell by Dodge & Munn his attys.

UNITED STATES PATENT OFFICE.

EDWIN L. BUSHNELL, OF POUGHKEEPSIE, NEW YORK.

IMPROVEMENT IN SPRING-MATTRESSES.

Specification forming part of Letters Patent No. 95,984, dated October 19, 1869; reissue No. 4,103, dated August 23, 1870; reissue No. 4,616, dated October 31, 1871.

*To all whom it may concern:*

Be it known that I, EDWIN L. BUSHNELL, of Poughkeepsie, in the county of Dutchess and State of New York, have invented certain new and useful Improvements in Spring-Mattress; and I do hereby declare that the following is a full, clear, and exact description thereof, reference being had to the accompanying drawing making part of this specification, and to the letters of reference marked thereon, like letters indicating like parts wherever they occur.

To enable others skilled in the art to construct and use my invention, I will proceed to describe it.

My invention relates to spring-beds; and it consists, first, in constructing the springs of wire with eyes or loops, formed by bending or twisting the wire that forms the spring in such a manner that the spring, with its eyes or loops, shall all be made of a single continuous piece of wire, and the eyes or loops be arranged to hold in place the cord used for uniting a series of the springs to form a bed-bottom or mattress; and it further consists in the uniting a series of springs in a novel manner, whereby a complete mattress or spring-bed bottom is produced, all as hereinafter more fully explained.

Figure 1:
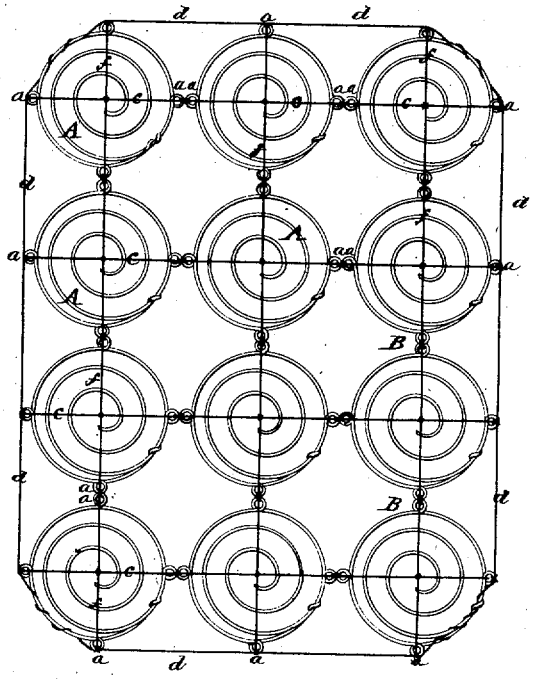
Figure 2:
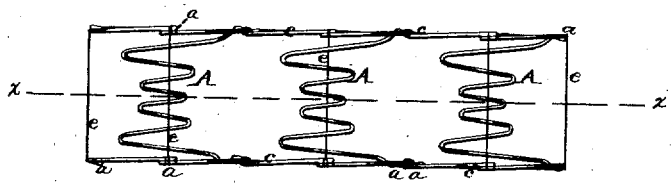

Figure 1 is a top-plan view of a horizontal section on line *x x* of Fig. 2, and Fig. 2 is an end elevation of a mattress complete.

Various attempts have heretofore been made, by myself and others, to construct a spring-bed by uniting side by side a series of spiral springs, the springs being connected together by means of cords, wire, or other similar devices. In order to afford means of attaching the cords to the springs and keep them in their proper position, it was necessary to provide the springs with eyes or loops, to which the cords were to be fastened; but in all cases these eyes or loops were made of separate or detached pieces, and then fastened to the springs by twisting or bending their ends around the wire of the spring, or by soldering them to the spring. Both of these plans were expensive, and all failed to operate satisfactorily, for the reason that, when secured loosely by bending or twisting, the eyes or loops would not retain their proper position, but would slip out of place; and when secured by soldering them to the springs they were constantly becoming detached. Especially did these difficulties occur when the mattress was rolled or doubled up for transportation, or was bent or doubled in the ordinary handling or turning of it in use.

My present invention has for its object the remedying of these difficulties, and thereby the producing of a more perfect and useful spring-bed or mattress.

To accomplish these objects I make a spring with eyes or loops on each end coil, by so bending or twisting the wire at those points as to form the eyes or loops in the same piece of wire that constitutes the spring, as represented in Fig. 1. The springs may be made of any suitable form, though I prefer to make them in the form of two truncated cones united at their smaller ends, as represented in Fig. 2, for the reason that it takes less material, and because, also, the springs are less liable to interlock with each other when the mattress is doubled, rolled, or bent. In the present case I form the eyes *a* at four points, equidistant from each other, in the outer end coil of the spring, at each end thereof, as shown in Fig. 1, the eyes being formed by a single twist in the wire at the required points. It is immaterial what the form or shape of the eye or loop is, and it may be made by either twisting or bending the wire, the sole requisite being that it shall be of such form or shape as to prevent the cord from slipping out of place, and be formed of the same piece that constitutes the spring itself, the function of these eyes or loops being simply as a means of securing the springs to each other and prevent the fastenings from becoming deranged. Across the upper and lower ends of each row of springs I stretch cords *c;* and at right angles to the cords *c*, but also across the ends of the springs, I stretch cords *f*. By means of these cords I tie the adjoining eyes of adjacent springs tightly together, and I also knot the cords *c* and *f* together wherever they cross each other at the centers of the springs, as shown in Fig. 1. The top and bottom eyes on the outside of each of the outer springs I connect by a cord, *e*, as shown in Fig. 2. I also connect the outside eyes at the top of all the springs by a cord, *d*, as shown in Fig. 2, and the corresponding eyes at the bottom of the outside springs by a cord, *d'*, as shown in Fig. 1. As already stated, I tie the adjoining eyes of the adjacent springs; but it is obvious that there are many ways of connecting these adjoining eyes besides that shown in the drawing.

When the springs are thus arranged, with or without having the cords extend across them, they form a light, strong, and elastic spring-mattress, which can be used on an ordinary bedstead without altering or changing the same in any way.

This mattress does not lose its form by use, nor do the springs become bent out of shape, as frequently happens in bed-bottoms, as, by my method of connecting the springs, weight cannot be applied to any one of them singly. When weight or strain is applied to any one of the series of springs, the spring being closely connected to the adjoining springs, the weight is distributed over several springs.

My principle of construction may be applied not only to mattresses, but to pillows, cushions, &c., the cords *e* being shortened in those cases to give the article a rounded form on the edges.

When my mattress is to be stored or transported it can be rolled up, either crosswise or lengthwise, into a compact and convenient form, and it will, on being released, immediately resume its original form.

This mattress is cheaper, lighter, and more elastic than the bed-bottoms in which wooden slats are used, and, unlike them, it affords no protection for vermin.

It is obvious that there are many ways in which the cords may be connected besides the one shown, the main object being only to so connect the eyes of the springs as to hold the latter firmly in position.

Having thus described my invention, what I claim is—

1. A spring for beds, having eyes or loops formed thereon by bending or twisting the wire of the spring, substantially as described.

2. The combination of a series of springs, A, united by connecting their adjoining eyes or loops, substantially as herein described.

3. In combination with the springs A, the cords *e* and *f*, arranged substantially as herein described.

EDWIN L. BUSHNELL.

Witnesses:
H. B. MUNN,
P. T. DODGE. (62)